(12) United States Patent
Hartikainen et al.

(10) Patent No.: US 6,298,377 B1
(45) Date of Patent: Oct. 2, 2001

(54) FIELD DEVICE MANAGEMENT SYSTEM

(75) Inventors: Kari Hartikainen, Espoo; Tuomo Honkanen, Helsinki, both of (FI)

(73) Assignee: Metso Field Systems Oy, Helsinki (FI)

( * ) Notice: Subject to any disclaimer, the term of this patent is extended or adjusted under 35 U.S.C. 154(b) by 0 days.

(21) Appl. No.: 09/148,067

(22) Filed: Sep. 4, 1998

(30) Foreign Application Priority Data

Jun. 1, 1998 (FI) .................................................. 981235

(51) Int. Cl.⁷ .......................... G06F 15/173; G06F 13/38
(52) U.S. Cl. .......................... 709/223; 700/17; 700/19; 709/220; 709/224; 702/183
(58) Field of Search .................................. 709/220, 224, 709/223, 226; 702/183; 395/600; 364/133; 700/17, 19; 340/825.06, 825.07

(56) References Cited

U.S. PATENT DOCUMENTS

| | | | |
|---|---|---|---|
| 5,550,980 | * | 8/1996 | Pascucci et al. ...................... 709/220 |
| 5,768,119 | * | 6/1998 | Havekost et al. ...................... 364/133 |
| 5,796,602 | * | 8/1998 | Wellan et al. ........................ 364/100 |
| 5,884,072 | * | 3/1999 | Rasmussen ........................... 395/600 |
| 5,958,012 | * | 9/1999 | Battat et al. .......................... 709/224 |
| 5,974,237 | * | 10/1999 | Shurmer et al. ....................... 709/224 |
| 5,991,806 | * | 11/1999 | McHann, Jr. .......................... 709/224 |
| 6,014,612 | * | 1/2000 | Larson et al. ......................... 702/183 |

\* cited by examiner

*Primary Examiner*—Farzaneh Farahi
(74) *Attorney, Agent, or Firm*—Pillsbury Winthrop LLP

(57) ABSTRACT

The invention relates to a management of field devices in industrial process systems. A maintenance management system collects status and/or diagnostic data of field devices over a field communication interface in a manner specific for each type of field device. The system processes the collected data and provides condition or event data, e.g. alarms and fault and device condition data to external systems, such as the automation system of a plant, by an open communication method, which is independent of the type of field device and the field communication interface. Such open communication methods are for instance electronic mail, Internet, Intranet, DDE (Dynamic Data Exchange), short message. The data structure of the event data are preferably independent of the type of field device, i.e. it is identical for different types of field device. The invention enables a transmission of limited generic condition data, which is sufficient for the operator of the plant, to a control room and more accurate text-based condition data to the maintenance personnel.

16 Claims, 2 Drawing Sheets

FIELD DEVICE MANAGEMENT SYSTEM

BACKGROUND OF THE INVENTION

The invention relates to field device management in industrial process systems and similar systems.

FIELD OF THE INVENTION

Field devices for industrial processes generally signify regulating devices, control devices, sensors, transducers, and the like, directly connected to the process. A typical field device is a control valve provided with a valve controller, such as the valve controller ND800 of Neles Controls Oy. So-called intelligent field devices are provided with a control logic or software, which may make it possible to control the field device locally for instance by means of a suitable control algorithm, to collect status and measurement data and/or to communicate with a field management system in accordance with a field communication protocol, such as HART (Highway Addressable Remote Transducer). Additionally, intelligent field devices contain that much diagnostics at present that a field device is capable of informing of its failure. This information can be utilized for recognizing the device requiring maintenance, which reduces the maintenance costs because unnecessary device testings are avoided. Moreover, the utilization ratio of a plant (factory) increases when the number of unanticipated shutdowns decrease.

Typical field management systems are PC programs provided with graphical user interfaces and comprising properties as follows: configuration of field device, configuration database, maintenance control of field device based on status data received from field device, and status database of field device. Examples of commercial field management systems are: Field Manager manufactured by Fisher-Rosemount Inc.; Documint manufactured by Honeywell Inc.; Cornerstone manufactured by Applied Technologies Inc.; Smartvision manufactured by Elsag-Bailey.

The maintenance control function is typically automatic and can be configurated by the user. At maintenance control, a software scans the field devices as desired by the user and stores the status, data desired by the user in the status database together with a time stamp. The status database can be browsed by means of a graphical user interface, which may be located anywhere in the plant. In this way, universal status data, which are very limited as far as e.g. condition data are concerned, are received from the field device. Status data items describing the condition of the device are typically: in condition and out of condition. This is often not enough for predictive or preventive maintenance.

Plant operators use so-called control room applications when running the plant by actual process control automation systems. Because the operator monitors the process day by day, he could start a maintenance step of a predetermined field device in time, if he were informed of the condition of said field device. A problem is to bring an information on a failure in the field device to the knowledge of the operator or maintenance person of the plant, because automation systems do not support digital field communication protocols, such as HART. A reason for this is that they are primarily regarded as configuration protocols of the field device or the communication protocol does not support a transmission of operating status data of the field device. The diagnostics of the field device is clearly an area belonging to the field device supplier and not to the supplier of the actual automation system. The present control room applications show only the data required for operating the process, and the operator has to check the status of the field devices relating to said process in a separate field device management software. To use a separate field device management software in the control room is problematic for the operator, because there is no connection between the field devices displayed by the software and the process to be monitored. This leads to the fact that the operator primarily monitors the process and does not react to the condition of the field device until it causes interference with the process.

The significance of diagnostics in intelligent field devices will continue to increase in a field bus environment. It is then especially important that the field device management concept and also the outputs and reports provided by it are clear and simple enough for the users. The present methods are not simple and sophisticated enough for this purpose. It is to be assumed that the two-way communication of the field devices will provide a flood of information in maintenance control software and automation systems. Accordingly, they rather increase the amount of work than decrease it. On the other hand, in order to achieve a simple and easy-to-use concept of diagnostics, the tools already existing in the control rooms should be utilized as much as possible. User interfaces of new application programs are not desired in the control room, because they require further training and maintenance and increase the complexity of running and monitoring the process. Actually, a user-friendly diagnostic system should not be visible to the user as a software provided with a separate user interface at all.

BRIEF DESCRIPTION OF THE INVENTION

The object of the invention is a maintenance management of field devices, which is simple and easy to use for the user.

This is achieved by a field management method according to a preferred embodiment of the invention.

In the invention, a maintenance control system of field devices communicates with the field devices of the process over a field communication interface using a predetermined field communication protocol, such as HART. The system may also have several different field communication interfaces. Over a field communication interface, status and/or diagnostic data of field devices are collected in a manner specific for each field device type. The system processes the collected data and produces condition or event data, e.g. alarms and also fault and maintenance data, to external systems, e.g. to the automation system, the process control room or some other control facility of the plant. The event and condition data are transmitted to an external system by an open communication method independent of the field device type and the field communication interface. Such open communication methods are for instance electronic mail, Internet, Intranet, DDE (Dynamic Data Exchange), short message. The system of the invention may preferably support several different open communication methods, by which event data can be transmitted to different destinations. The interaction between the system of the invention and another party over an open communication interface may be of client/server type, in which case for instance the system of the invention acts as a server.

The system of the invention produces event data of the process to any external destination supporting the open communication method used by the system. This solves the present problem, where an application and data transmission of the automation system have to be tailor-made for each field device for providing the information produced by intelligent field devices available to the automation system of the plant. The invention encapsulates the data transmission and offers open interfaces for applications of the automation system. Using open communicating technologies also decreases the need of tailoring and modifications in the automation system.

The data structure of event data is preferably independent of the field device type, i.e. it is similar for all types of field device. Generic condition (status) and event data signify here all the generic data processed or derived from the raw data received from the field device, which generic data enable an easy connection of the field device management system for instance to an application of the automation system or which are in a readable user-friendly form. The field management system of the invention enables an active transmission of generic condition data of field devices to the control room software of the automation system and a linking to the objects of the graphical process diagram displayed at the user interface. In an embodiment of the invention, the linking is based on a fixed list of generic condition data items depicting the condition of the field device, the list concealing from the configurator of the maintenance software the details of which raw data constitute the generic condition data of the field device, i.e. the list enables a connection of a manufacturer-specific maintenance management application of field devices to a control room application. The system of the invention produces these generic condition data items (data structures) independent of the field device type from the status and/or diagnostic data specific for each field device type and collected from the field devices, and transmits them to the control room application. From the control room application point of view, the interface and the condition data items are always similar, typically defined by the configurator of the control room software. For instance, adding a new type of field device to the process requires changes only in the field device management system of the invention. In the system, device type-specific data, from which a predetermined condition data item is produced, may also be changed or combined freely. For instance, it is possible to create virtual field devices by linking together two or more physical field devices. For instance, two successive emergency stop valves may form a virtual emergency stop device, whose condition is represented by the cooperation of the two devices. Or correspondingly, a virtual loop device may comprise a valve and a flow indicator.

In an embodiment of the invention, the status and/or diagnostic data and/or generic condition data describing the condition of a field device in more detail are transferred to a database, from where they are readable by a separate application, or they are outputted in a user-friendly form as a report e.g. in HTML format as a WWW page, whereby they can be read in any part of the plant or outside the plant by means of a commercial browser, or outputted as a report e.g. in ASCII format, whereby they can be read locally. Other document formats may also be used. Because the condition of a field device can be described in a text format, the content of the report can be produced by a manufacturer-specific maintenance management system of the field device, unlike the prior art field management systems, where the status and/or diagnostic data of a field device are based on standard content, which again is very limited.

The invention makes it possible that the maintenance management system of a field device may transmit limited generic condition data, which is sufficient for the operators of the plant, to the control room, and more detailed text-based condition data to the maintenance personnel.

The system of the invention may also store unprocessed (raw) status and/or diagnostic data collected from field devices in a database for later processing. The later processing may consist in diagnosing the field device more accurately by device-specific software, for instance.

In an embodiment of the invention, each type of field device (but not each device) has a dedicated application program or unit, which is called device agent. A device agent is an application to be run automatically and arranged to collect status and/or diagnostic data from field devices of specific type, to process data and to produce condition or event reports on the basis of the collected and/or processed data. The device agents are independent of each other, but use a common field communication interface towards the field devices and common services of the open communication interface, such as server/client services. This modular structure enables, an introduction of a new type of field device into the system by providing it with a dedicated device agent. Correspondingly, updatings of an old type of field device require modification, e.g. reprogramming in one device agent only. Virtual field devices described above may also be provided by a device agent.

BRIEF DESCRIPTION OF THE DRAWINGS

The invention will now be described in more detail by means of preferred embodiments, with reference to the attached drawings, in which.

DETAILED DESCRIPTION OF THE INVENTION

The present invention can be applied to all industrial processes or the like comprising intelligent field devices. Intelligent field devices signify here any device relating to a process or an automated system or a control thereof which shall be controlled and is capable of producing data describing the condition of the device directly or indirectly, this data being known as condition data. A typical intelligent field device of this kind is a control valve provided with a valve controller.

Figure 1:
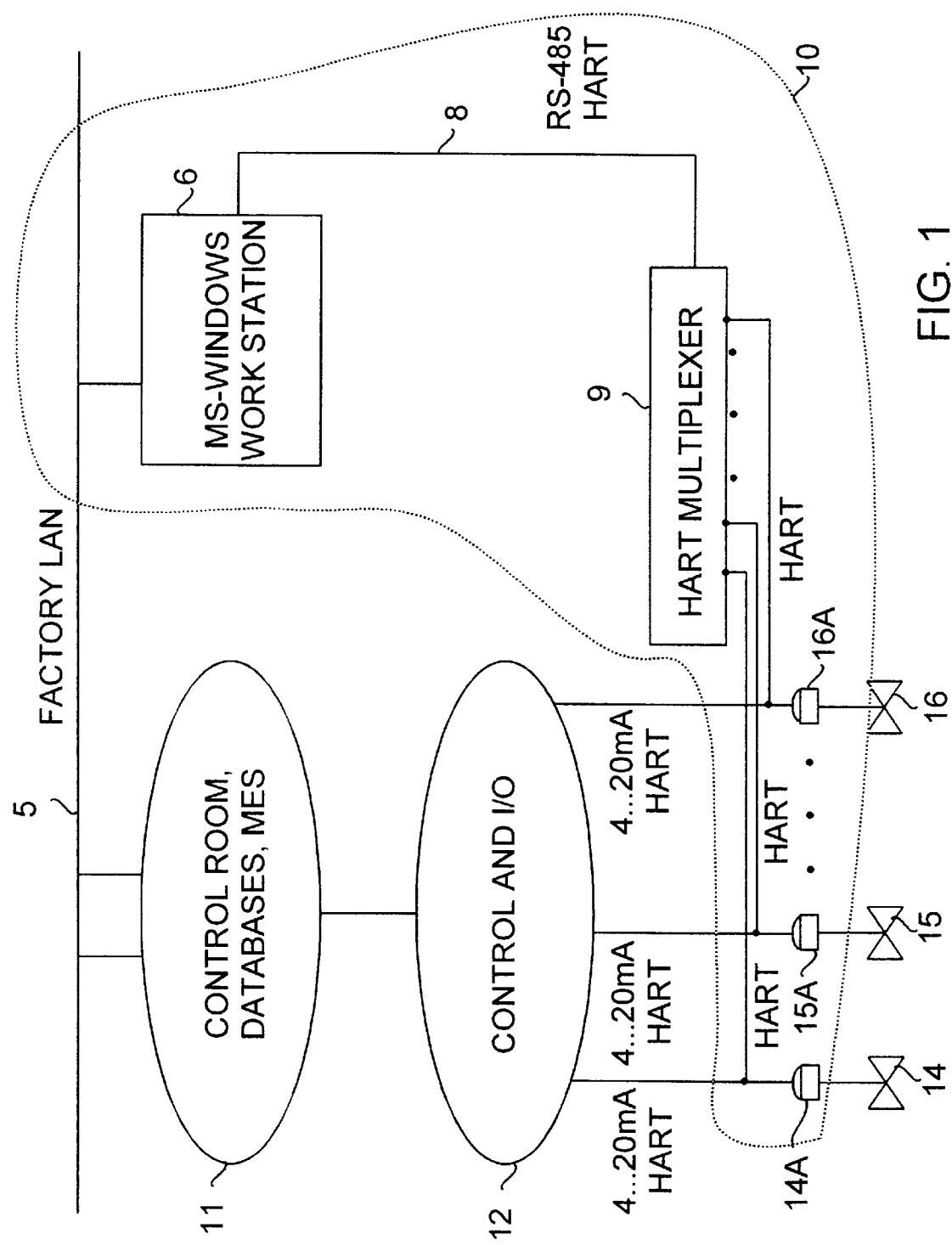
FIG. 1 shows a field device maintenance management system according to the invention, connected to a process automation system of a factory.

FIG. 1 shows a general block diagram of a process automation system and, joined thereto, a maintenance management system of field devices according to the invention. The automation system comprises control room programs and databases 11 as well as process control programs and an I/O part 12. The control and I/O part 12 is connected via buses in accordance with HART standard to intelligent field devices constituted by control valves 14, 15, 16 and valve controllers 14A, 15A, 16A. The valve controller guide may be for instance an ND 800 of Neles Controls Oy. HART (Highway Addressable Remote Transducer) is based on transmitting digital data together with a conventional 4 to 20 mA analog signal. HART enables a two-way communication, by means of which intelligent field devices can be controlled and data can be read from them. A HART protocol follows the reference model of a protocol stack by OSI (Open System Interconnection), which model has been developed by the International Organization for Standardization (ISO). In layer 7 (application layer), HART instructions are transmitted. A HART instruction set contains universal commands understood by all field devices and device-specific commands providing functions which are restricted to an individual device (device type). The HART protocol enables a point-to-point configuration, in which there is a separate bus (pair of wires) between each field device and a master unit, or a multidrop configuration, in which up to 15 field devices are connected to the same field bus (pair of wires). The HART protocol is described in greater detail for instance in the publication HART Field Communication Protocol: An Introduction for Users and Manufacturers, HART Communication Foundation, 1995. The HART protocol has also become industrial de facto standard. However, it is to be understood that the type or implementation of the field communication interface, i.e. the field bus and the protocol used by it, is not significant for the present invention.

The condition of field devices is monitored by means of a field device maintenance management system 10 according to the invention, which system collects data from the field devices. For this purpose, each field device 14, 15 and 16 is connected via a respective field bus to a conventional HART multiplexer 9, which again is connected via an RS-485 bus 8 to a PC 6. The operating system of PC 6 is Windows 95/98 or Windows NT, for instance. Moreover, a work station 6 is connected to a local area network LAN of the factory (over which network it may communicate with control room software, for example).

The work station 6 contains a maintenance management software for field devices. The purpose of the software is to collect data from the intelligent field devices 14 to 16. This data collecting is fully automatic and requires no staff. On the basis of the collected data, the condition of the device can be analyzed and a message informing of the conditon can be sent to another system, such as to the other parts of the automation system of the factory, e.g. to the display of the control room application.

Figure 2:
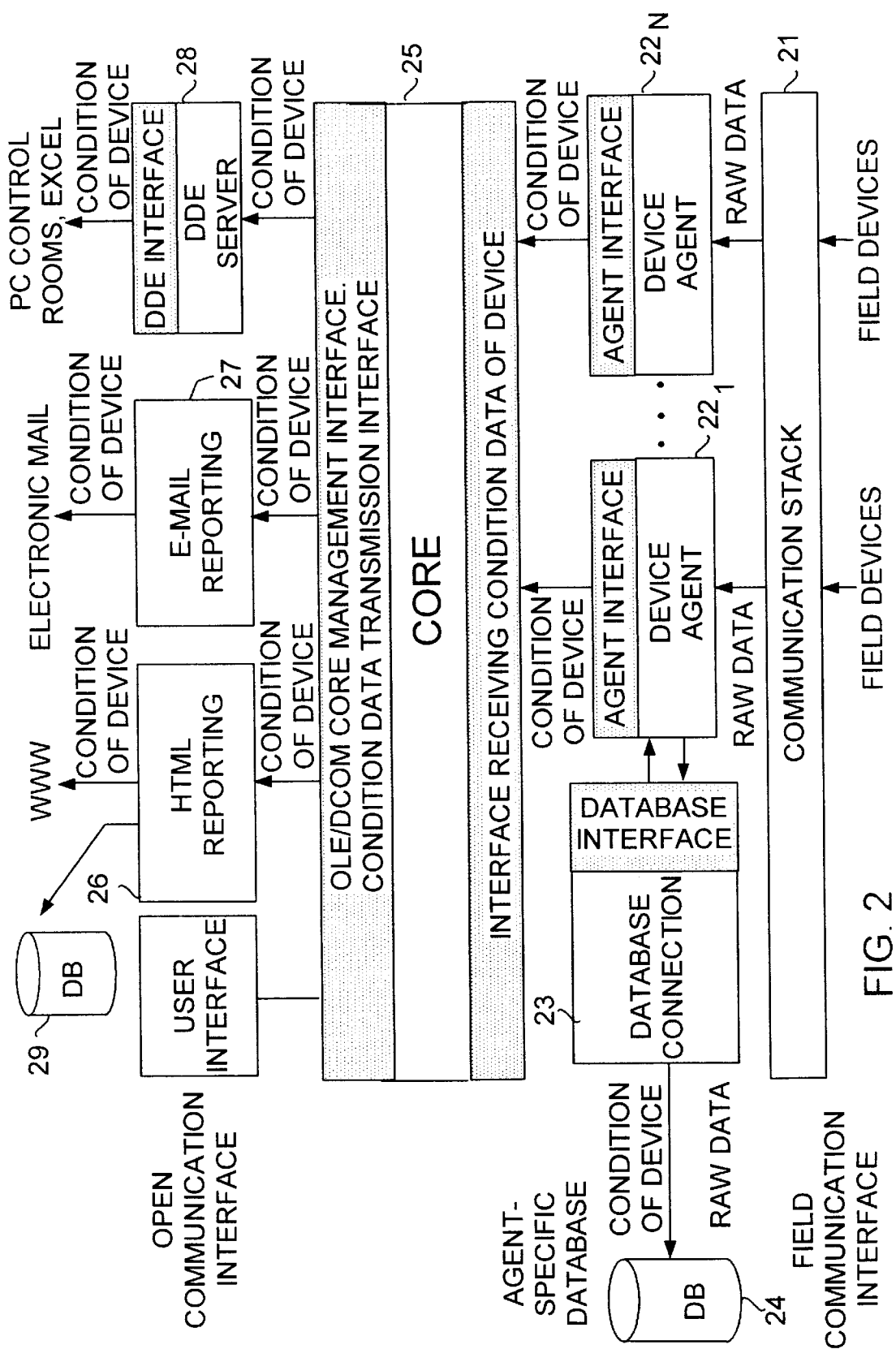
FIG. 2 shows components of the maintenance management system according to a preferred embodiment of the invention.

FIG. 2 is a general block diagram illustrating components of the field device maintenance management system or software according to a preferred embodiment of the invention. The purpose of a communication stack 21 is to enable traffic on a HART bus. The communication stack contains routines RS-485 for the control of serial ports and interface functions for processing data coming through the serial ports by software.

Device agents $22_1 \ldots 22_N$ are independent program components using the communication stack 21 as they desire. A device agent is device type-specific (not device-specific). For instance, two different control valves or control valves of different manufacturers may represent different device types. Two identical field devices having different uses or monitoring different matters may also belong to different device types. Generally, field devices requiring mutually different applications (device agents) for collecting data, analyzing and producing status data may be classified to different device types. A device agent contains all necessary data and instruction sets for reading, analyzing and/or processing the status and diagnostic data of field devices of a predetermined type, and also for producing status data for the device. Moreover, the device agent 22 may store the collected raw data and device condition data derived from them over a database interface 23 to an agent-specific database for a later use. A more accurate diagnosis of the field device may then be made on the basis of the raw data by device-specific software, as by Valve-Manager when the ND800 valve controller is used. The device agents 22 have a simple agent interface to a core 25 of the software. Over the agent interface, the device agent 22 may send the core 25 an information on the condition of each field device. These condition data of the field device to be sent over the agent interface are called event data. Event data are preferably in an open format being independent of the type of field device, such as a text-based report, for instance. It is also possible that an intelligent field device analyzes its condition itself, whereby the raw data received over the communication stack 21 may already contain the condition data of the field device. In this case, the device agent may process the condition data further, for instance on the basis of the data it has received from the process automation system, or transmit the condition data of the device as such to the core 25.

The software core 25 comprises a timer and a management of the agents, event data and devices. The task of the timer is to give each device agent $22_1 \ldots 22_N$ separately a permission to use the communication stack 21, i.e. access to the HART field bus. The priority level of the field devices can be varied, whereby higher number of data retrieval accesses in a time unit may be given to a predetermined field device than to another field device. Number of the device-specific priority levels may be for instance four: no data are retrieved from the field device, data are retrieved from the field device normally, data are retrieved from the field device twice as often as normally and data are retrieved from the field device four times as often as normally. Additionally, the timer may give the device agents $22_1 \ldots 22_N$ a permission to collect timed data from the field devices at suitable intervals, for instance once an hour, a day, a week, a month or a year, which data are not urgent, but useful for predictive maintenance, for instance.

For the maintenance management of the device agents, the core 25 may contain data of the device agents 22 of the system. For the field device management, the core 25 contains data of the field devices subjected to the control of each device agent 22.

For the management of event data, the events transmitted by the device agents 22 to the core 25 are stored in a field device-specific database inside the core. In other words, the condition data of each field device are stored separately in the core 25. When the core 25 receives an event concerning a predetermined field device from a device agent, it compares this event with the preceding event, which is stored in the database of said field device in the core 25. If the content of the event has changed, i.e. a change has occurred in the condition of the field device, the core 25 sends the changed condition data forward over an open communication interface, whereby the change in the condition of the field device appears for instance at the user interface of the control room application. Such a manner of event transmission is called "exception-based", because only the changes in the status of the field device are informed forward.

The core 25 transfers the event messages over a status data transmission interface to one or more event processors 26, 27 and 28. An event processor is a program component whose task is to change an event message to a format understood by another system. The other system may be for instance a database, a control room of an automation system or a maintenance reporting system. The event processors provide an open communication interface with the other system. Open communication interface implies for instance that the communication method by which the condition data of the field devices are transmitted to the other system its independent of the type of field device and the nature of field communication interface. The event processor may be, for instance, an e-mail program sending the status data of the field device as an e-mail report to the other system. The event processor may also be, for instance, a WWW (World Wide Web) server 26 creating an HTML report from the condition data of the field devices, which report is offered as a WWW page. The other system can then read the WWW page with a commercial browser via Intranet or Internet. The event processor may also create an HTML report or another text-based report, which is then sent to the other system. The event processor may also store the created (for instance text-based) report in the database, from where it can be read. The event processor may also be a DDE server in communication with the control room or other systems over a local network LAN, for instance. The event processors 26, 27 and 28 are preferably Windows programs, possibly commercial programs. Between the core 25 and the event processors 26 to 28, there is then preferably an interface in accordance with the Distributed Component Object Model (DCOM), over which interface an event message informing of the condition of the field device can be transmitted from the core 25 to the event processors 26 to 28.

The core 25 transmits the condition data to the event processor for instance as a text-based report or file, which the event processor inserts as the content of an e-mail message or a short message (e.g. GSM), for instance, and the processor sends the message to a predetermined address or several addresses. Correspondingly, the event processor may change the content of the HTML/WWW page on the basis of the text-based condition data received from the core. Internet and Intranet are TCP/IP networks known per se, the most significant application of which is WWW, but which also offer other data communication services applicable to the purpose of the present invention. These all are well-known data transmission technologies, detailed information and commercial applications of them being available, and it is not necessary to describe them here any further. On the whole, the basic idea of the open communication interface concept of the present invention is that any general data transmission technology supported by another system may be applied as an open interface.

The modular structure of the maintenance management software or system of field devices according to the invention enables a development and change of the system, component by component. In addition, these modular functions may be distributed to the local area network of the factory, and even to the Internet, which is an important feature, because the automation system of a modern factory is built around a local area network and this tendency is becoming even stronger. The modular structure also enables a flexible selection and change of the event processor, i.e. the open communication technology used. Thus, the system needs not be based on a predetermined communication technology, but it may introduce new technologies to be developed, when necessary. The modular structure also offers a simple manner of implementing an event processing, which supports the communication technology used by the other system at each time. Accordingly, the need of tailoring is reduced.

It is obvious that, as the technique develops, the basic idea of the invention may be implemented in many different ways. Consequently, the invention and its embodiments are not restricted to the above examples, but they can vary within the spirit and scope of the claims.

What is claimed is:

1. A maintenance management method for field devices, the method comprising:

providing a first group of first type field devices, the first type field devices having first data and a first instruction set to read, analyze, and process status and diagnostic data associated with said first type field devices;

providing at least a second group of second type field devices, the second type field devices having second type data and a second instruction set to read, analyze, and process status and diagnostic data associated with said second type field devices;

collecting at least one of the status and diagnostic data of said first-type field devices in a process, the collecting (i) using a field communication interface of a process automation system and based upon a field communication protocol, and (ii) being implemented in a field device type-specific manner utilizing said first data and said first instruction set, and providing first condition data representative of a condition of said first type field devices, said first condition data being independent of a type of the first type field devices;

collecting at least one of the status and diagnostic data associated with said second-type field devices in a process, the collecting (i) using the field communication interface based upon the field communication protocol, and (ii) being implemented in a field device type-specific manner utilizing said second data and said second instruction set, and providing second condition data representative of a condition of said second type field devices, said second condition data being independent of a type of the second type field devices; and transmitting said first and second condition data to another application of the automation system, the other application including at least one of control room software, maintenance management software, and another application software, said transmitting using an open communication method independent of the first and second type field devices and the field communication interface.

2. A method according to claim 1, wherein said open communication method is at least one of electronic mail, Hyper Text Multi Language, Dynamic Data Exchange and short message.

3. A method according to claim 1 or 2:

providing generic condition data items of a predetermined type, identical for all types of field device, from the status and/or diagnostic data specific for each field device type, transmitting said condition data items to a control room application, displaying the information on the condition data items at the graphical user interface of the control room application, preferably linked to the objects of a process diagram, representing the respective field devices.

4. A method according to claim 1 or 2:

transmitting unprocessed device type-specific status and/or diagnostic data to a database, reading the status and/or diagnostic data in the database by a separate application for making a more accurate diagnosis and/or reports.

5. A method according to claim 1 or 2:

processing the device type-specific status and/or diagnostic data into a condition report, which is independent of the field device type, such as a text-based condition report, transmitting the condition report by an open communication method independent of the field device type, as by electronic mail, Hyper Text Markup Language, Dynamic Data Exchange, World Wide Web, Internet, Intranet, and/or storing the condition report in a database to be read or transmitted later.

6. A method according to claim 5:

converting the device type-specific status and/or diagnostic data into an HTML report, transmitting the converted HTML report to a database, reading the HTML report in said database by a browser.

7. A method according to claim 1 or 2, comprising:

collecting process control data through said communication interface from the automation system controlling the process; and utilizing said process control data for analyzing and/or processing said field device-specific status and/or diagnostic data and for producing condition reports or generic condition reports independent of the field device type.

8. A maintenance management system for field devices, the system comprising:

a first group of first type field devices, the first type field devices having first data and a first instruction set to read, analyze, and process status and diagnostic data associated with said first type field devices;

a second group of second type field devices, the second type field devices having second data and a second instruction set to read, analyze, and process status and diagnostic data associated with said second type of field devices;

a field communication interface using a field communication protocol for communication with said first and second type field devices;

a first device agent structured to (i) collect at least one of status and diagnostic data associated with said first type field devices over said field communication interface in a field device type-specific manner, the manner being configured to utilize said first data and said first instruction set, and (ii) provide first condition data associated with said first type field devices, said first condition data being independent of a type of the first type field devices;

a second device agent structured to (i) collect at least one of status and diagnostic data associated with said second type field devices over said field communication interface in a field device type-specific manner, the manner being configured to utilize said second data and said second instruction set, and (ii) provide second condition data associated with said second type field devices, said second condition data being independent of a type of the second type field devices; and means for transmitting at least one of the first and second condition data or condition reports based on said first and second condition data of said first type and said second type field devices by an open communication method independent of the type of said first and second type field devices and the field communication interface to another application of the automation system including at least one of control room software, maintenance management software, and some other destination.

9. A system according to claim 8, wherein the system comprises control means controlling the collecting of the status and/or diagnostic data over the field communication interface and the transmission of the condition data or condition reports.

10. A system according to claim 9, wherein said control means are arranged to store the condition data of the field devices provided by the device agents in a field device-specific manner and to transmit the condition data or the condition report only in case if a change in the condition of the field device is detected.

11. A system according to claim 9, wherein said field communication interface comprises a field bus, to which are connected two or more field devices, and the control means assign data retrieval turns to the device agents for an access to the field bus.

12. A system according to any one of the claims 8 to 11, wherein the system comprises a database, in which the device agents store unprocessed status and/or diagnostic data collected from the field devices and/or condition data produced from that, for a later processing.

13. A system according to claim 12, wherein the database is readable by a device type-specific diagnostic application.

14. A system according to any one of the claims 8 to 11, wherein said open communication method comprises one or several from the following: electronic mail, DDE, HTML, short message, Intranet, Internet.

15. A system according to any one of the claims 9 to 11, wherein there is a Distributed Component Object Model interface for transmitting the condition data of the field devices between the control means and an application program supporting said open communication method.

16. A system according to any of the claims 9 to 11, wherein the control means have a user and configuration interface, over which the operation of the control means is remote-controlled.

* * * * *